N. WEYER.
TRAP NEST.
APPLICATION FILED JAN. 26, 1917.
1,234,841.
Patented July 31, 1917.
2 SHEETS—SHEET 2.
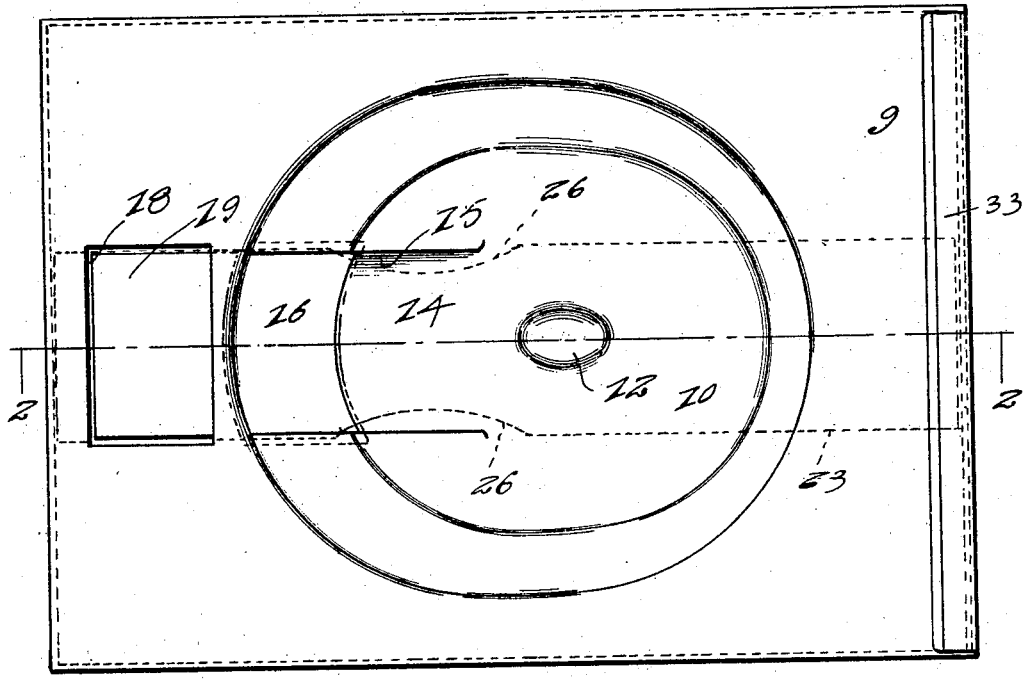
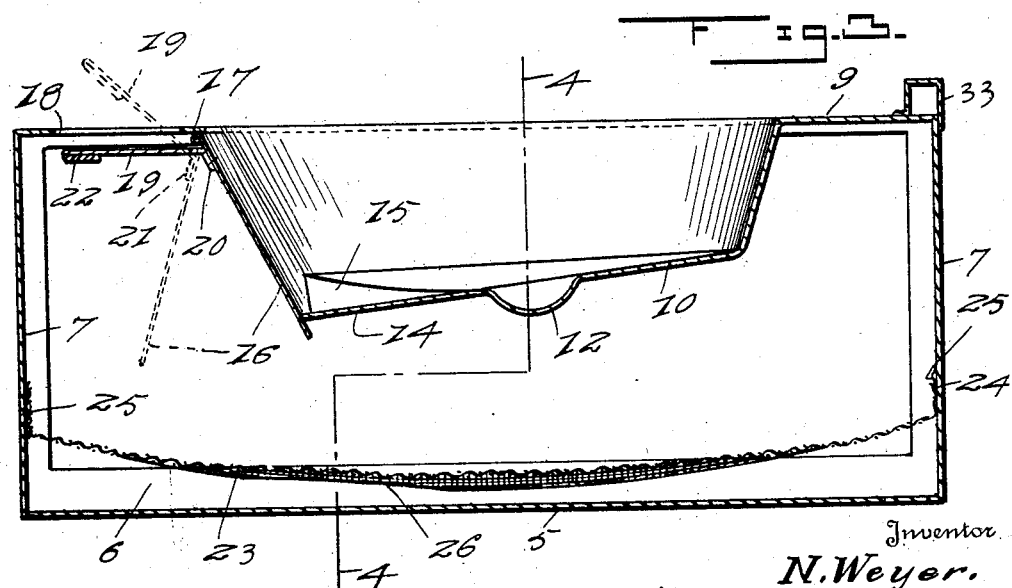
Witnesses
Inventor
N. Weyer.

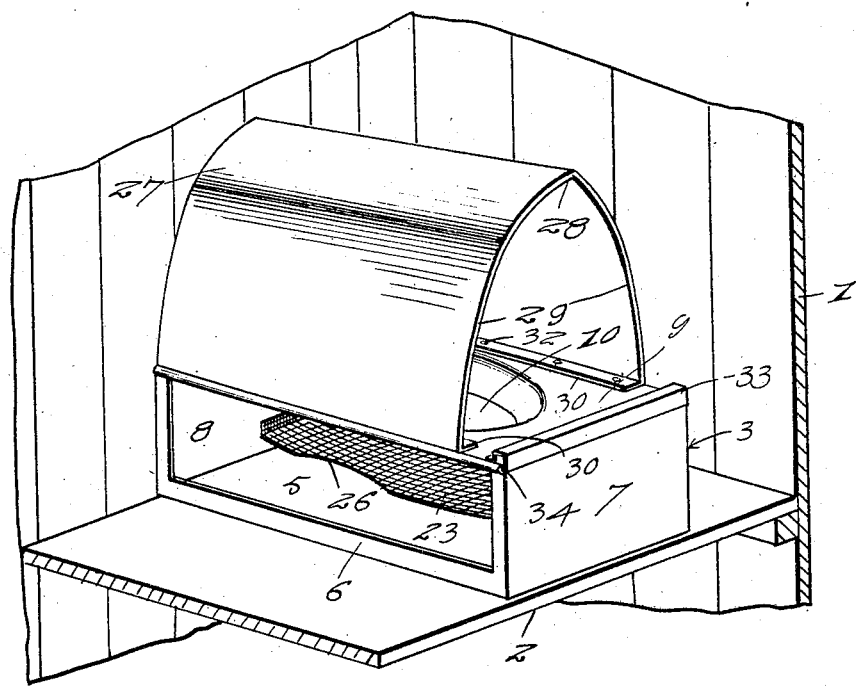
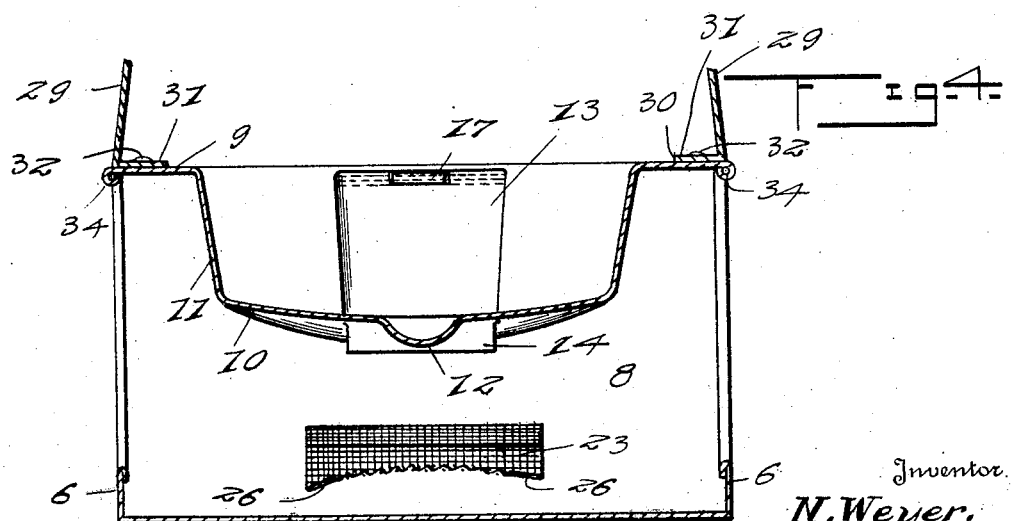

UNITED STATES PATENT OFFICE.

NICK WEYER, OF LEWISTON, MINNESOTA.

TRAP-NEST.

1,234,841.  Specification of Letters Patent.  Patented July 31, 1917.

Application filed January 26, 1917.  Serial No. 144,621.

*To all whom it may concern:*

Be it known that I, NICK WEYER, a citizen of the United States, residing at Lewiston, in the county of Winona and State of Minnesota, have invented certain new and useful Improvements in Trap-Nests; and I do hereby declare the following to be a full, clear, and exact description of the invention, such as will enable others skilled in the art to which it appertains to make and use the same.

This invention relates to improvements in trap nests.

The object of this invention is the provision of a trap nest which is so constructed as to provide a nest which is comfortable and acceptable to the hen and which provides means for obviating deterioration of the eggs, and one that protects the eggs from casual accidents.

A still further object of this invention is the provision of a nest of this character, which is of such construction that the same may be washed and cleaned in a reliable and easy manner so that the nest will be kept in a healthy state at all times.

A still further object of this invention is the provision of a nest which is constructed of metal, thus preventing insects from infesting the nest and thereby obviating the necessity of using various poisons on the nest to prevent the insects from getting on the hen.

A still further object of this invention is the provision of a nest which is equipped with a novel trap door which permits the eggs after laid in the nest to pass out of the nest into a box like structure, thus preventing the hen from destroying the eggs after being laid.

A still further object of this invention is the provision of a trap nest of this character, which will be simple, practical, and comparatively inexpensive in construction, and one that can be manufactured and sold at a low cost.

With these and other objects in view, the invention consists of the novel combination and arrangement of parts hereinafter more fully described and set forth in the claims hereto appended.

In the drawings:

Figure 1 is a fragmentary portion of a hennery in perspective, illustrating my improved nest in perspective, and supported therein, Fig. 2 is a top plan view of my improved nest with the hood removed, Fig. 3 is a vertical longitudinal sectional view, taken on the line 3—3 of Fig. 2, Fig. 4 is a sectional view taken on the line 4—4 of Fig. 3.

Like numerals of reference designate corresponding parts in all the figures of the drawings.

Referring more particularly to the drawings, the numeral 1 designates a fragment of a hen house in which is located a suitable support 2 upon which my improved nest 3 is positioned. The nest 3 as shown upon the shelf upon the support 2 is so arranged as to permit a plurality of these nests to be positioned on the support 2 in spaced relation to one another.

My improved nest 3 comprises in its construction, a box like structure which includes a bottom wall 5, side walls 6, a front wall 7, rear wall 8 and a top wall 9, all constructed of a single piece of metal, such as heavy tin or the like, which construction permits the nest to be washed so that it may be kept in a clean and sanitary condition at all times.

The side walls 6 are provided with rectangular cut out portions constituting openings to permit access to the interior of the box like structure when assembled.

The top wall 9 is depressed centrally to provide a substantially oblong seat which has a bottom wall 10 and side wall 11. The side wall 11 is inclined downwardly and inwardly and the bottom wall 10 is substantially concavo-convex in cross section and is provided centrally with a depressed false egg receiving recess 12.

The oblong formation of the seat in the top wall prevents the hen from sitting crosswise of the nest when laying eggs. The entire bottom wall 10 inclines downwardly from the forward to the rear end thereof, the purpose of which will be hereinafter more fully described.

The inclined side wall 11 is provided at the rear end with a rectangular opening 13 and the bottom wall 10 is depressed at the rear thereof as at 14 so as to provide an inclined runway from the center of the bottom wall 10 to the rear end thereof and communicates with the opening 13, thus permitting the eggs when laid upon the bottom wall 10 to roll toward the center and then down the inclined portion 14 and out through the opening 13 in the rear thereof.

The depressing of the portion 14 of the bottom wall 10 provides the vertical side walls 15 which prevent the hen from getting her feet caught in the nest thus obviating injury to the hen when laying eggs in the nest.

A door 16 is hingedly secured as at 17 to the under side of the top wall 9 at the rear thereof and completely covers the opening 13 in the wall 11. The lower edge of the door 16 projects downwardly below the depressed portion 14 of the bottom wall 10, thus constituting a stop for the door when in a closed position.

The top wall 9 is provided centrally of its side longitudinal edges and adjacent the rear end with a rectangular opening 18 through which is adapted to move the weight carrying arm 19. The weight carrying arm 19 has one end bent angularly as at 20 and is secured to the rear side of the door 16 adjacent the upper end thereof as at 21 and the arm is normally held in a horizontal position when the door is in closed position.

A weight 22 is secured to the under side of the arm 19 at the outer end thereof and this weight is of sufficient size to normally overcome the weight of the door so as to effectively hold the door closed, but at the same time, permit the door to be swung outwardly away from the opening 13 when struck by an egg traveling down the inclined depressed portion 14, thereby permitting the eggs to pass from the seat 10 over the depressed portion 14 out through the opening 13 and drop into and upon the bottom wall 5 of the box like structure.

A cushioning element 23 constructed of fine foraminous material has its ends bent upwardly as at 24 to provide attaching elements which are secured to the inner sides of the front and rear walls 7 and 8, centrally of their side longitudinal edges. The attaching portions 24 are secured to the front and rear walls as at 25, thus positioning the body of the cushioning element directly under the opening 13 in the seat member.

The cushioning element 23 has its opposite side longitudinal edges cut out as at 26 and this element inclines from its point of connection to the front and rear walls toward the center thereof so that when the eggs drop from the depressed portion 14, they will strike the cushioning element and roll upon the bottom wall 5 of the box like structure and thereby the eggs are prevented from being broken or otherwise injured when traveling from the seat 10 to the bottom wall 5 of the box like structure.

When the eggs roll down the inclined portion 14, and strike the door 16, they force the door outwardly moving the weight carrying arm upwardly through the opening 18, thus permitting the eggs to pass through the opening 13 and fall upon the cushioning element in the manner above described.

A hood or cover 27 formed of suitable metal, such as tin or the like is curved at its medial portion as at 28 to provide the side members 29, which members have their lower longitudinal edges bent angularly as at 30 to define attaching members which are adapted to be secured upon the top member as 31 by suitable fastening means 32, such as bolts, screws, rivets or the like. The hood 27 is arranged to completely cover the depressed seat portion 10 and will also assist in preventing the hen from sitting sidewise of the nest when laying an egg.

The hood has its rear end flush with the rear end of the box like structure, so that when the same is positioned upon the supporting member 2 in the hen house 1, it will completely close the rear end of the nest and leave its front side fully open so that the hen may have access to the nest.

A strip 33 is secured to the upper edge of the front wall 7 as at 34 to facilitate the drawing of the nest or box like structure outwardly to permit a person to place his hands in the sides of the box like structure to remove the eggs therefrom.

What is claimed is:

1. A trap nest comprising a box like structure, including a bottom wall, front and rear walls, and side walls, a top wall, all formed of a single piece of material, said side walls provided with rectangular openings, said top wall provided centrally with a depressed portion constituting a seat member, said seat member provided with an inclined side wall and concavo-convex bottom wall, said bottom wall sloping from the front to the rear thereof, and provided centrally with a false egg receiving recess, said bottom wall having a depressed portion extending from the center to the rear end thereof, constituting an egg runway, said side wall provided with an opening in the rear thereof communicating with the runway, a hinged door closing said opening and runway, an arm secured to the door, a weight carried by said arm for normally holding the door closed, a cushioning element secured to the front and rear walls of the box like structure and located beneath the seat member, and a hood rigidly secured to the top wall and located over said seat member, as and for the purpose specified.

2. A trap nest comprising a box like structure including a top wall, a bottom wall, end walls and side walls, all formed of a single piece of material, said top wall being depressed at its medial portion to constitute a seat, the bottom wall of which inclines from its forward end to its rear end and is provided with a run way, an opening in the side wall communicating with the run way, a door for normally closing said opening in the side wall, means for holding the door closed, said door adapted to be moved outwardly against the tension of the means when struck by an egg passing from the bottom wall of the seat into the bottom of the box like structure and a cushioning element secured to the end wall in spaced relation to the bottom wall to prevent injury to the egg when dropping from the seat into the box like structure.

In testimony whereof I affix my signature in presence of a witness.

NICK WEYER.

Witness:
    BENNETT S. JONES.

Copies of this patent may be obtained for five cents each, by addressing the "Commissioner of Patents, Washington, D. C."